US009274805B2

(12) United States Patent
Anderson et al.

(10) Patent No.: US 9,274,805 B2
(45) Date of Patent: Mar. 1, 2016

(54) SYSTEM AND METHOD FOR THERMALLY AWARE DEVICE BOOTING

(75) Inventors: Jon J. Anderson, Boulder, CO (US); Ron F. Alton, Oceanside, CA (US); Praveen Kumar Chidambaram, Longmont, CO (US); Joshua D. Thielen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 13/420,139

(22) Filed: Mar. 14, 2012

(65) Prior Publication Data

US 2013/0227261 A1    Aug. 29, 2013

Related U.S. Application Data

(60) Provisional application No. 61/602,755, filed on Feb. 24, 2012.

(51) Int. Cl.
*G06F 9/00* (2006.01)
*G06F 9/44* (2006.01)

(52) U.S. Cl.
CPC .................................. *G06F 9/4401* (2013.01)

(58) Field of Classification Search
USPC ........................................ 713/1, 2, 100, 300
See application file for complete search history.

(56) References Cited

U.S. PATENT DOCUMENTS

| | | | | |
|---|---|---|---|---|
| 5,930,738 | A * | 7/1999 | Jones ............................ | 702/132 |
| 6,718,474 | B1 * | 4/2004 | Somers et al. ................ | 713/322 |
| 7,036,030 | B1 * | 4/2006 | Altmejd ........................ | 713/322 |
| 7,313,717 | B2 * | 12/2007 | Vecoven et al. ..... | G06F 11/0712 714/4.2 |
| 7,552,346 | B2 | 6/2009 | Aguilar, Jr. et al. | |
| 7,793,291 | B2 | 9/2010 | Arai et al. | |
| 8,032,722 | B2 | 10/2011 | Yoshida | |
| 8,078,864 | B2 | 12/2011 | Lin et al. | |
| 2001/0047473 | A1 * | 11/2001 | Fallon ............................. | 713/2 |
| 2004/0028162 | A1 * | 2/2004 | Skahan et al. ................ | 375/356 |
| 2006/0065751 | A1 | 3/2006 | Marcato et al. | |
| 2006/0174149 | A1 * | 8/2006 | Hottelet ................ | G06F 1/3203 713/324 |
| 2007/0296408 | A1 | 12/2007 | Liao et al. | |
| 2008/0296397 | A1 | 12/2008 | Cheng | |
| 2010/0070746 | A1 | 3/2010 | Chiu | |
| 2010/0287364 | A1 | 11/2010 | Chu | |
| 2011/0131400 | A1 | 6/2011 | Chiu et al. | |

FOREIGN PATENT DOCUMENTS

| | | |
|---|---|---|
| CN | 101751092 A | 6/2010 |
| DE | 102008054600 A1 | 6/2010 |
| EP | 2088493 A2 | 8/2009 |
| KR | 2006017333 A | 2/2006 |
| KR | 20110055300 A | 5/2011 |
| TW | 200951689 A | 12/2009 |

OTHER PUBLICATIONS

International Search Report and Written Opinion—PCT/US2013/026869—ISA/EPO—Jun. 12, 2013.

* cited by examiner

*Primary Examiner* — Kim Huynh
*Assistant Examiner* — Paul J Yen
(74) *Attorney, Agent, or Firm* — Nicolas A. Cole

(57) ABSTRACT

Various embodiments of methods and systems for thermally aware booting in a portable computing device ("PCD") are disclosed. Because bringing high power consumption processing components online when a PCD is booted under less than ideal thermal conditions can be detrimental to the health of the PCD, embodiments leverage a low power processing component early in a boot sequence to authorize, delay or modify the boot sequence based on measured thermal indicators. One exemplary method is essentially a "go/no go" method that delays or authorizes completion of a boot sequence based on the thermal indicator measurements. Another exemplary method modifies a boot sequence of a PCD based on a thermal boot policy associated with a thermal boot state. A thermal boot policy may include allowing the boot sequence to complete by modifying the power frequency to which one or more high power consumption components will be booted.

76 Claims, 9 Drawing Sheets

500

NORMAL THERMAL BOOT STATE — 405

- THERMAL INDICATORS INDICATE THAT PCD IS EXPERIENCING SAFE THERMAL ENERGY LEVELS WELL BELOW ELEVATED THRESHOLDS
- ALLOW ALL COMPONENTS IN PCD TO BE BOOTED AT FULL POWER AND FUNCTIONALITY LEVELS

ELEVATED THERMAL BOOT STATE — 410

- THERMAL INDICATORS INDICATE THAT PCD IS EXPERIENCING HIGHER THAN IDEAL THERMAL ENERGY LEVELS SUCH THAT AN UNALTERED BOOT SEQUENCE MAY JEOPARDIZE THE HEALTH OR PERFORMANCE OF ONE OR MORE COMPONENTS
- MODIFY BOOT SEQUENCE BY SCALING PERFORMANCE LEVELS OF ONE OR MORE COMPONENTS TO MAINTAIN HIGHEST PERFORMANCE AND LITTLE OR NO PERCEPTION IN QUALITY OF SERVICE TO OPERATOR OF DEVICE

SEVERE THERMAL BOOT STATE — 415

- THERMAL INDICATORS INDICATE THAT PCD IS EXPERIENCING SEVERE THERMAL ENERGY LEVELS SUCH THAT AN UNALTERED BOOT SEQUENCE WILL JEOPARDIZE THE HEALTH OR PERFORMANCE OF ONE OR MORE COMPONENTS
- MODIFY BOOT SEQUENCE BY SCALING PERFORMANCE LEVELS OF ONE OR MORE COMPONENTS WITH PROBABLE PERCEIVABLE REDUCED PERFORMANCE BY OPERATOR OF DEVICE
- BOOT SEQUENCE MODIFICATION MAY INCLUDE SIGNIFICANT SCALING OF ONE OR MORE COMPONENTS DURING BOOT AND/OR COMPLETE DELAY OF BOOT OF COMPONENT(S)

CRITICAL THERMAL BOOT STATE — 420

- THERMAL INDICATORS INDICATE THAT PCD IS EXPERIENCING CRITICAL THERMAL ENERGY LEVELS SUCH THAT A BOOT SEQUENCE WILL CAUSE A POWER COLLAPSE AND REBOOT AND/OR JEOPARDIZE THE HEALTH OF ONE OR MORE COMPONENTS
- DELAY BOOT SEQUENCE UNTIL THERMAL ENERGY DISSIPATES

*FIG. 5*

Thermal Performance Lookup Table

| Thermal Boot State | Thermal Indicator (Temp C) | Thermal Boot Policy |
|---|---|---|
| Normal | < 65 | 2 cores @ 1.5 GHz |
| Elevated | 65 – 75 | 2 cores @ 918 MHz |
| Severe | 76 – 80 | 1 core @ 786 MHz |
| Critical | > 80 | Delay boot |

*FIG. 8*

SYSTEM AND METHOD FOR THERMALLY AWARE DEVICE BOOTING

CROSS-REFERENCE TO RELATED APPLICATIONS

Priority under 35 U.S.C. §119(e) is claimed to the U.S. provisional application entitled "SYSTEM AND METHOD FOR THERMALLY AWARE DEVICE BOOTING," filed on Feb. 24, 2012 and assigned application Ser. No. 61/602,755, the entire contents of which are hereby incorporated by reference.

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, as are often found in larger computing devices such as laptop and desktop computers. Instead of using fans, PCDs may rely on thermal mitigation software designed to trade off PCD performance for a lower rate of thermal energy generation. Thermal mitigation software, which typically runs on the main processors in a PCD, can be very effective at managing thermal energy generation. Often, temperature measurements within the PCD trigger the thermal mitigation software to either implement or end a given thermal mitigation technique. Thermal mitigation techniques may reduce the opportunity for thermal energy generated by various components within a PCD to give rise to temperatures that could jeopardize component health or negatively impact user experience. Consequently, efficient use of thermal mitigation techniques may also optimize the quality of service ("QoS") provided by the PCD to a user, thereby also optimizing user experience, without endangering the health of the PCD.

Even so, despite the most advanced thermal mitigation techniques, temperatures within a PCD can still reach critical levels under any number of extreme use cases. For example, under heavy processing burdens in hot ambient environments, touch temperatures can exceed thresholds suitable for user exposure or die temperatures can reach levels that jeopardize the health of processing components and memory devices. When a PCD is exposed to such conditions, often the only means to avoid thermal runaway and protect the health of components within the PCD is to force a power collapse before rebooting the PCD.

Notably, rebooting a PCD under elevated temperature conditions may only necessitate a series of power collapses if the PCD is too hot for the main processors to come online. And, if the main processors are not online, then the thermal mitigation software running thereon cannot be executed to manage thermal energy generation. Accordingly, what is needed in the art is a method and system for a thermally aware boot mode that authorizes and/or delays a PCD boot sequence based on a comparison of thermal measurements with predetermined thresholds. Moreover, what is needed in the art is a method and system for a thermally aware boot mode that, based on a comparison of thermal measurements with predetermined thresholds, scales the performance level to which one or more processing components in the PCD are booted.

SUMMARY OF THE DISCLOSURE

Various embodiments of methods and systems for thermally aware booting in a portable computing device ("PCD") are disclosed. Because bringing high power consumption processing components online when a PCD is booted under less than ideal thermal conditions can be detrimental to the health of the PCD, embodiments of the systems and methods leverage a low power processing component early in a boot sequence to authorize, delay or modify the boot sequence based on measured thermal indicators. The thermal indicators may be any measurable parameter that is useful to indicate the thermal condition of the PCD or components within the PCD.

One method for thermally aware booting in a PCD is essentially a "go/no go" method that polls a sensor(s) in the PCD for a measurement associated with a thermal indicator parameter. The sensor(s) are associated with one or more components within the PCD that may be affected by the measured thermal condition if it exceeds a threshold. The polled measurement is thusly compared to a predetermined threshold and, if the measurement exceeds the threshold, the boot sequence is delayed. Advantageously, the delay may give excess thermal energy an opportunity to dissipate from the PCD before more thermal energy is generated as a result of booting one or more high power consumption components. Moreover, some embodiments may include the ability to delay the boot sequence multiple times until a polled measurement indicates that it is safe to boot the PCD or a preset number of delay cycles has been reached.

Another exemplary embodiment of a method for thermally aware booting in a PCD may modify a boot sequence of a PCD based on identification of a thermal boot policy associated with a thermal boot state. The method polls a sensor(s) in the PCD for a measurement associated with a thermal indicator parameter. The sensor(s) are associated with one or more components within the PCD that may be affected by the measured thermal condition if it exceeds a threshold. A thermal policy lookup ("TPL") table that includes thermal boot policies associated with thresholds for the thermal indicator is queried. The polled measurement is compared to the thresholds documented in the TPL table and a thermal boot policy is identified. Once identified, the thermal boot policy is applied to the boot sequence by a low power processing component and, in some embodiments, may include allowing the boot sequence to complete by modifying the power frequency to which the high power consumption components will be booted.

Advantageously, as one of ordinary skill in the art will recognize, by leveraging a low power processing component early in a boot sequence to authorize, delay or modify the boot sequence based on measured thermal indicators, embodiments of the systems and method can optimize the quality of service ("QoS") provided by the PCD without jeopardizing the health of components or overly impacting user experience.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 5 is a diagram illustrating exemplary thermally aware boot policies that may be applied to optimize QoS and overall user experience and are dependent upon a particular thermal boot state of a PCD;

FIG. 8 is an exemplary thermal performance lookup table that may be queried by embodiments of the method illustrated in FIG. 7.

DETAILED DESCRIPTION

Figure 1:
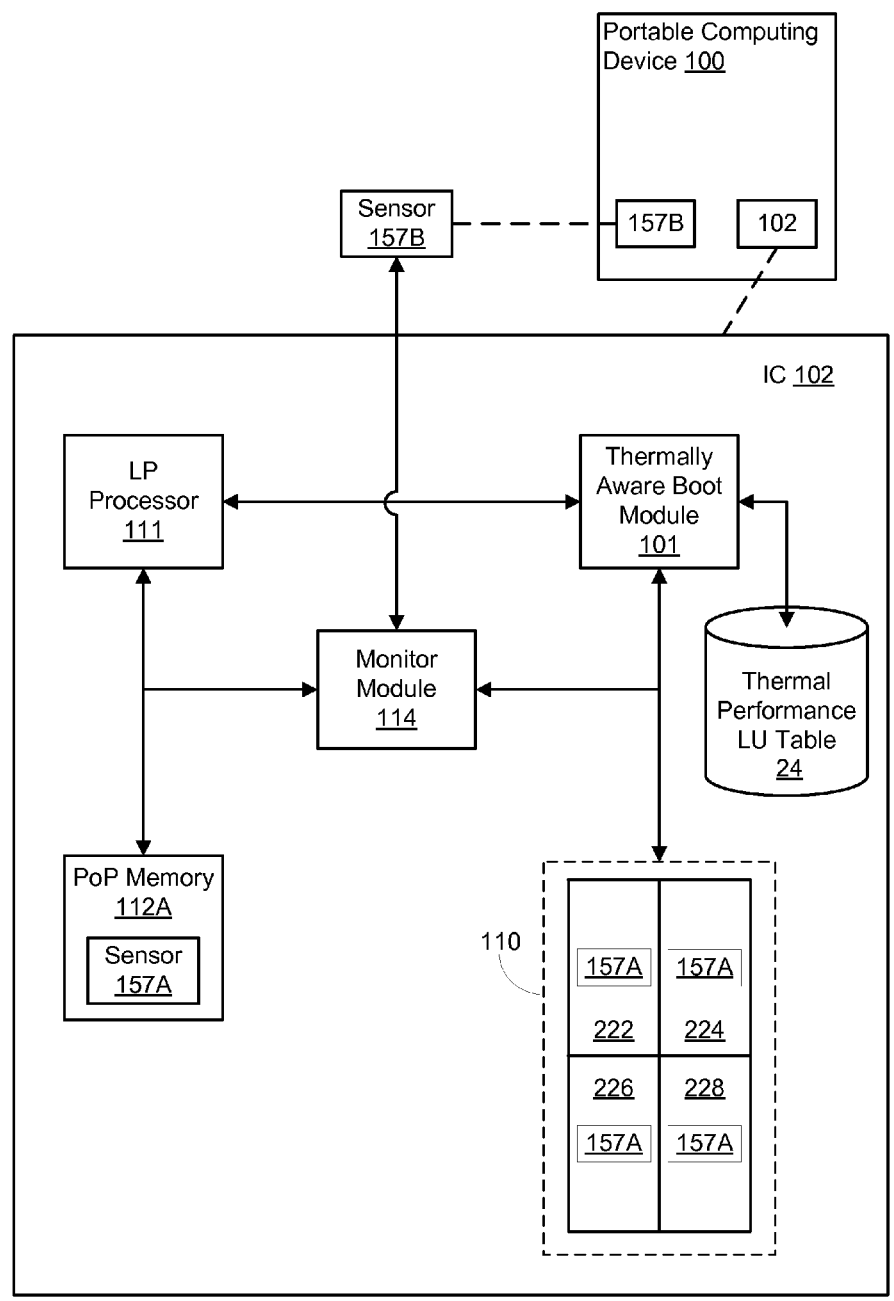
FIG. 1 is a functional block diagram illustrating an embodiment of an on-chip system for implementing a thermally aware boot sequence in a portable computing device ("PCD")

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD. That is, although many of the embodiments are described in the context of a processing component, it is envisioned that thermally aware booting may be applied for the benefit of any functional component within a PCD including, but not limited to, a modem, a camera, a wireless network interface controller ("WNIC"), a display, a video encoder, a peripheral device, a package on package ("PoP") memory device, etc.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in thermal equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" or "thermal aggressor" may be, but is not limited to, a central processing unit, a graphical processing unit, a core, a main core, a sub-core, a processing area, a hardware engine, etc. or any power consuming component residing within, or external to, an integrated circuit within a portable computing device.

In this description, the terms "thermal mitigation technique(s)," "thermal policies," "thermal management," "thermal mitigation measure(s)" and "thermal mitigation software" are used interchangeably. Notably, one of ordinary skill in the art will recognize that, depending on the particular context of use, any of the terms listed in this paragraph, or their equivalents, may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, frequent reference is made to the potential for detrimental effects on the "health" of a PCD or component in a PCD if exposed to certain thermal conditions. In the context of this description, it will be understood that a detrimental effect on the "health" of a component is meant to include any detrimental effect on the functional aspects of a component ranging in severity from temporary, operational instability to permanent component damage. To this end, one of ordinary skill in the art will recognize that some thermal conditions may render a component permanently inoperable while under different thermal conditions the same component may experience only temporary instability. For example, prolonged exposure to high levels of thermal energy may destroy a memory component in a PCD while the same memory component under less extreme thermal conditions may only experience temporary failures with no lasting effect on its functionality.

In this description, the terms "boot," "reboot," "boot mode," "boot sequence," "boot phase" and the like are meant to refer to the initial set of operations that a PCD performs when it is initially powered on including, but not limited to, loading the operating system and preparing the various PCD components for use. To this end, the terms "online" or "coming online" will be understood in this description to be the end result of a completed "boot" of a component, or components, in a PCD.

Attempting to boot a PCD when thermal indicators, such as on-die temperature measurements, are above certain thresholds can jeopardize the health of any number of components within the PCD. For example, the integrity of a package on package ("PoP") memory device comprising stacked ball grid array ("BGA") memory components can be sacrificed if the PoP memory is exposed to thermal energy dissipated from a nearby thermal aggressor when on-die temperatures are already elevated, such as may be experienced by a PCD after an intensive gaming session or being left in a hot automobile. Similarly, the silicon in powerful multi-core processing components can degrade if the processing component is brought online at full power, or even something less than full power, during a boot sequence when temperatures are already elevated.

As is understood by one of ordinary skill in the art, these exemplary components and other processing components within a PCD may produce and dissipate thermal energy while processing workloads. In excess, the dissipation of the thermal energy generated by these thermally aggressive components can cause irreparable damage to the overall functionality of the PCD. Usually, therefore, an attempted boot of a PCD when thermal indicators exceed certain thresholds can result in a series of power collapses and reboots to mitigate the risk of irreparable harm to the health of one or more components in the PCD. Power collapses and reboots, while useful for protecting the health of a PCD, negatively affect a user's experience.

Ensuring that a PCD completes its boot sequence, without jeopardizing the health of its various heat sensitive components or overly impacting user experience in a negative way, can be accomplished by a thermally aware boot ("TAB") module that leverages one or more sensor measurements in the early stages of the boot phase. An exemplary embodiment of a TAB module takes advantage of a low power ("LP") processing component, such as a resource power manager ("RPM") processor, which is configured to come online in the early stages of a boot sequence. A TAB module that may include a thermally aware boot software aspect running on the LP processor leverages measurements associated with thermal indicator(s) taken by a monitoring module. The monitoring module may poll one or more temperature sensors, for example, located around the die of an application specific integrated circuit ("ASIC") or other integrated circuit and, in some cases, use an analog to digital converter hardware to convert the measurement data to a digital signal.

The digital signals generated by the monitor module may be representative of any number of measurements that can be correlated with thermal indicators of thermal energy dissipation levels such as, but not limited to, touch temperatures of the PCD, processing temperatures associated with CPU core(s), ambient temperatures proximate to a PoP memory device, state of charge ("SoC") readings associated with a battery, leakage current levels on a power bus, etc. The signals, once received by the TAB module, may be compared to predetermined thresholds for the given measurements. The predetermined thresholds may be based any number of parameters for the given thermal indicator including, but not limited to, a maximum allowable touch temperature of the PCD, a maximum operating temperature of a component in the PCD, a minimum charge level for a battery in the PCD, a maximum current level on a power bus in the PCD, etc.

Based on the comparison of the measurements to the thresholds, some embodiments of a TAB module may elect to complete or delay the boot sequence. In other embodiments, the TAB module may leverage the comparison to select a scaled performance level for one or more components in the PCD and then modify the boot sequence such that the given components come online at reduced performance levels. As would be understood by one of ordinary skill in the art, bringing a processing component online at a reduced power level may cause the component to generate relatively lower rates of thermal energy. Further, by booting the one or more components to a reduced performance level, one of ordinary skill in the art will recognize that a short boot time duration can be maintained without the risk to PCD health that could result from booting the components to full power levels.

For example, in some embodiments the monitor module may take a reading from a temperature sensor located near a core of the PCD's main CPU. The temperature reading may indicate to the TAB module that the temperature of the core is below a maximum threshold and, as such, bringing the high power consumption CPU online at full power would not be detrimental to the CPU and/or other components within the PCD. In such a scenario, the TAB module may authorize the LP processor to advance or complete the boot sequence without modification. If, however, the temperature reading is determined by the TAB module to exceed a predetermined threshold, the TAB module may elect for the boot sequence to be delayed so that the thermal energy causing the elevated temperature can be dissipated. Alternatively when a threshold is exceeded, the TAB module may modify the boot sequence such that when it is completed the CPU will come online at a scaled power level associated with a rate of thermal energy generation that will not over impact the existing thermal footprint of the PCD.

Advantageously, by temporarily delaying or modifying the boot sequence in such manners, potentially catastrophic or negative impacts on the health of one or more components in the PCD can be avoided without power collapsing the PCD or completely restarting the boot process. That is, permanent component damage or performance instability resulting from exposure to excess thermal energy can be avoided without power collapsing or completely restarting the boot process of the PCD. In this way, user experience and QoS levels may be optimized when the PCD is booted under less than ideal thermal conditions. Moreover, it is envisioned that some embodiments may delay the boot sequence indefinitely, or for a set number of cycles, as the thermal indicator measurements continue to be polled and compared to the predetermined thresholds.

Notably, the exemplary embodiments described and illustrated herein are primarily directed toward delaying, authorizing or modifying a boot sequence based on polled thermal indicators. In a more general sense, however, the embodiments seek to determine available "thermal headroom" before electing to delay, authorize or modify a process within a PCD. As such, one of ordinary skill in the art will recognize that a boot sequence is just one example of a process within a PCD that may be delayed, authorized for completion or modify based on one or more polled thermal indicators. Thus, it is envisioned that embodiments of the systems and methods may authorize or modify any process so long as the "thermal headroom" quantified by the difference between a polled measurement and a given threshold suggests that such process may be completed without causing the threshold to be exceeded. As a non-limiting example, certain embodiments may compare a polled thermal indicator to a threshold before electing to delay, authorize or modify a workload scheduled for processing on a certain high power core. Notably, in such an embodiment, delaying or modifying the scheduled workload may include changing its priority such that other workloads associated with lesser levels of thermal energy generation may be processed instead.

FIG. 1 is a functional block diagram illustrating an embodiment of an on-chip system 102 for implementing a thermally aware boot sequence in a PCD 100. Embodiments of a thermally aware boot sequence leverage measurements of thermal indicators, such as temperature measurements, from one or more locations within a PCD 100 to determine whether it is safe for all components within the PCD 100 to come online. If the measurements indicate that it would be detrimental to one or more components within the PCD 100 to come online, the boot sequence may be delayed until subsequent readings of the measurement(s) indicate that thermal conditions are more favorable for completion of the boot sequence. Alternatively, some embodiments may modify the boot sequence such that one or more components come online at a reduced power level that correlates to relatively lower rates of thermal energy generation and dissipation. In these ways, embodiments can secure the overall health of the PCD 100 and avoid consecutive reboots.

As explained above, many PCDs 100 include main thermal policy manager modules 113 running on a main processing component such as CPU 110. The main thermal policy manager modules 113 may be configured to apply any number thermal mitigation techniques in an effort to manage thermal energy generation when the PCD 100 is operational and processing workloads. During the early phases of a boot sequence, however, the main CPU 110 is not yet online and so the main thermal policy manager modules 113 running thereon are not activated. Moreover, if temperatures associated with the CPU 110 (or other processing component such as exemplary PoP memory 112A) are elevated then it could be detrimental to the health of the CPU 110 and/or other components within PCD 100 if the CPU 110 is allowed to come online and start generating excessive amounts of thermal energy.

In general, the system employs two main modules which, in some embodiments, may be contained in a single module: (1) a TAB module 101 for comparing thermal indicator measurements with predetermined thresholds and delaying, authorizing or modifying an ongoing boot sequence; and (2) a monitor module 114 for polling relevant sensors 157 located throughout PCD 100 and relaying the polled measurements to the TAB module 101. Advantageously, embodiments of the system and method that include the two main modules leverage the sensor measurements to optimize the overall health of the PCD 100 and minimize the necessity for power collapses and reboots that negatively impact user experience.

An LP processor 111, for example a resource power manager ("RPM") processor, that comes online early in a boot sequence and consumes low levels of power (consequently generating relatively low levels of thermal energy) may be configured to manage a boot sequence such that it authorizes other, higher power consumption components, such as CPU 110, to come online. As would be understood by one of ordinary skill in the art, an LP processor 111 may be configured to control any number of functions including, but not limited to, clock switching, power switching, etc. A system and method for implementing a thermally aware boot sequence is not limited, however, to leveraging an RPM processor as any component within a PCD that is configured to run early in a boot sequence may be suitable for implementation of a given embodiment.

Returning to the FIG. 1 illustration, the LP processor 111 is shown in communication with a TAB module 101, a monitor module 114 and two exemplary components within PCD 100—PoP memory 112A and CPU 110. Notably, all or part of the TAB module 101 and/or monitor module 114 workload may be processed by the LP processor 111. It will be understood that PoP memory 112A and CPU 110 are shown for illustrative purposes only and, as such, embodiments of systems and methods for implementing a thermally aware boot sequence are not limited in application to PoP memories and/or CPUs. Rather, it will be understood that various embodiments of the systems and methods may be used to optimize health of any component within a PCD 100 that may suffer as a result of completing a boot sequence under less than ideal thermal conditions.

Moreover, although the sensors 157 are generally referred to in this description as measuring a thermal indicator in the form of an on-die or off-die temperature reading, it is envisioned that some embodiments of a system and method for implementing a thermally aware boot sequence may leverage sensors that measure thermal indicator parameters other than temperature. For example, as stated above, it is envisioned that in some embodiments the sensors 157 may measure a thermal indicator in the form of a battery's state of charge to determine whether the battery has capacity for sustaining a processing load that will result from a completed boot sequence. Or, in some embodiments, the sensors 157 may measure electrical current levels on power rails to deduce a given component's thermal energy levels. As such, although it is expedient at various points in the present description to refer to the thermal indicator simply as a "temperature measurement" or "temperature reading" or the like, one of ordinary skill in the art will recognize that the described embodiments and their equivalents are not limited to leveraging thermal indicator measurements in the direct form of a temperature measurement. Rather, it will be recognized that it is completely within the scope of this disclosure that any indicator of thermal energy levels can be used by an embodiment to determine or trigger a thermally aware boot policy.

The monitor module 114 polls readings taken from sensors 157 such as, for example, temperature readings. In the FIG. 1 illustration, sensors 157B are located off chip 102 and the remaining exemplary sensors 157A are located proximate to PoP memory 112A and the cores 222, 224, 226, 228 of CPU 110. Under an exemplary use case, the PCD 100 may have experienced elevated processing temperatures at the CPU 110 resulting from an intense, high workload gaming session. The monitor module 114 polling the sensors 157A associated with one or more of the cores 222, 224, 226, 228 of CPU 110 may recognize the high temperature levels and communicate them to the TAB module 101. The TAB module 101 may compare the measured temperature levels to a predetermined threshold and instruct the LP processor 111 to delay powering the CPU 110 until some of the thermal energy causing the elevated temperatures has dissipated to safer levels. Similarly, temperatures measured proximate to the PoP memory 112A that exceed safe levels for the health of the PoP memory 112A may trigger the TAB module 101 to instruct the LP processor 111 to delay the boot sequence in an effort to avoid generating thermal energy that could cause the temperature near PoP device 112A to reach critical levels. Similarly, the off chip sensor 157B may be positioned to measure the touch temperature of PCD 100 and delay or authorize a boot sequence based on a predetermined threshold for acceptable touch temperature.

Returning to the exemplary use case, other embodiments of a TAB module 101 may query a thermal performance lookup ("TPL") table 24 to determine reduced power levels to which one or more processing components may be booted without overly impacting the thermal state of the PCD 100. For example, the temperature measurement polled at a sensor 157A may indicate that the temperature near the CPU 110 is approaching a level that could be detrimental to the PoP memory 112A but has not exceeded such threshold. In such a case, the TAB module 101 may determine from its query of TPL table 24 that the CPU 110 may be powered at fifty percent of its maximum frequency without risk of generating enough energy to cause the threshold to be exceeded. Consequently, the TAB module 101 may modify the boot sequence such that the CPU 110 is powered at fifty percent of its maximum frequency, thereby optimizing user experience by bringing the CPU 110 online without jeopardizing the health of the PoP memory 112A. More detail concerning exemplary thermal boot states will be described relative to FIGS. 4-5 and 7.

Figure 2:
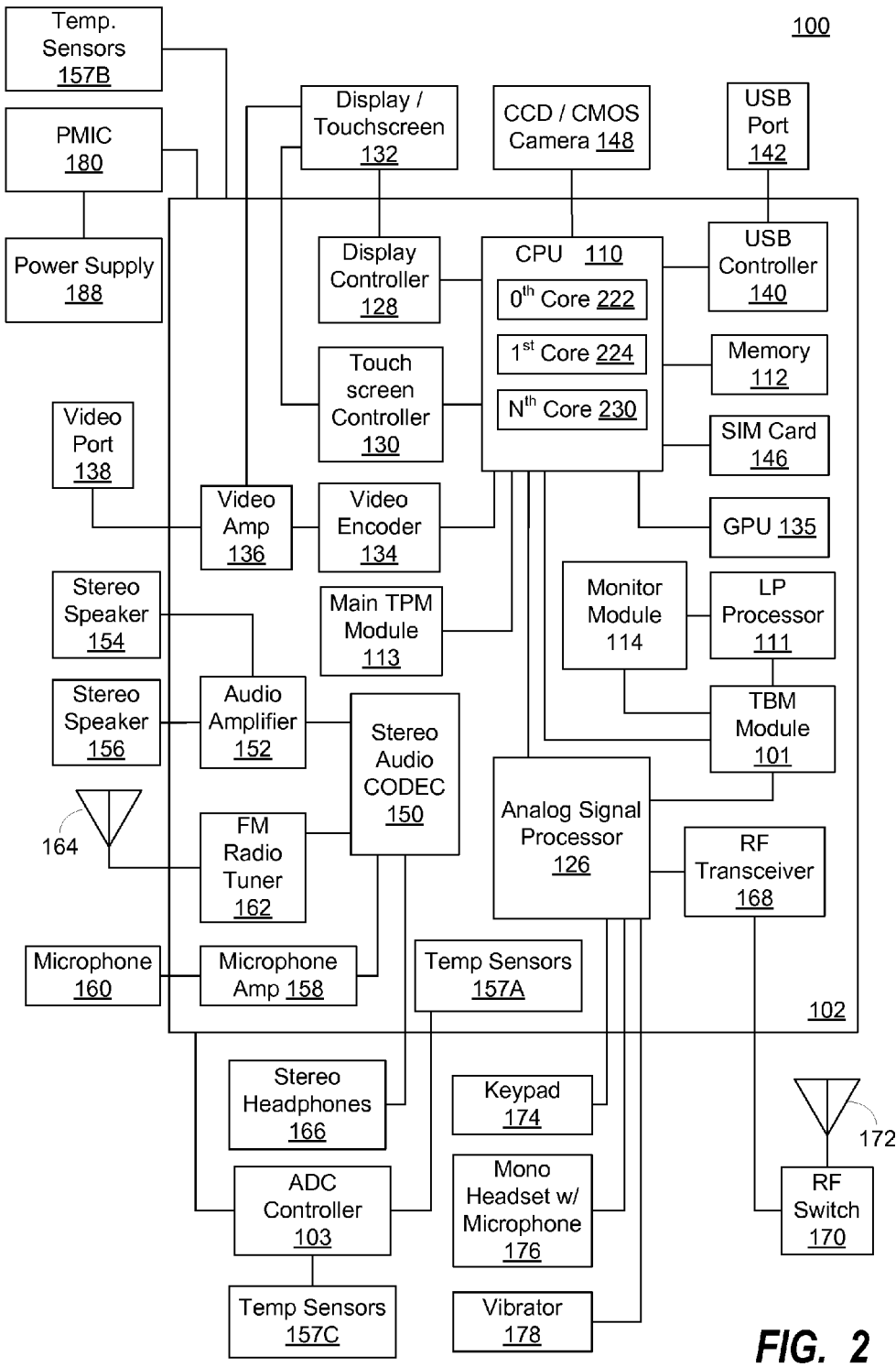
FIG. 2 is a functional block diagram illustrating an exemplary, non-limiting aspect of the PCD of FIG. 1 in the form of a wireless telephone for implementing methods and systems that delay, authorize or modify a boot sequence based on monitored thermal conditions.

FIG. 2 is a functional block diagram illustrating an exemplary, non-limiting aspect of the PCD 100 of FIG. 1 in the form of a wireless telephone for implementing methods and systems that delay, authorize or modify a boot sequence based on polled thermal conditions. As shown, the PCD 100 includes an on-chip system 102 that includes a multi-core central processing unit ("CPU") 110 and an analog signal processor 126 that are coupled together. The on-chip system 102 also includes a low power ("LP") processor 111, such as a resource power manager processor. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the thermally aware boot ("TAB") module 101 may be responsible for comparing temperature related measurements with predetermined thresholds and, based on the comparisons, electing to authorize, delay or modify a boot sequence of the PCD 100. Advantageously, by delaying or modifying a boot sequence when polled temperatures exceed predetermined thresholds, or fall within predefined thermal state ranges, a TAB module 101 may help a PCD 100 manage thermal conditions and/or thermal loads and avoid experiencing adverse thermal conditions, such as, for example, reaching critical temperatures during a boot sequence.

FIG. 2 also shows that the PCD 100 may include a monitor module 114. The monitor module 114 communicates with multiple operational sensors (e.g., thermal sensors 157) distributed throughout the on-chip system 102 and with the LP processor 111 of the PCD 100 as well as with the TAB module 101. The TAB module 101 may work with the monitor module 114 to identify early in a boot sequence adverse thermal conditions relative to predetermined temperature thresholds and/or ranges and delay or modify the boot sequence in an effort to manage thermal energy dissipation.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112, which may include a PoP memory 112A, and a subscriber identity module ("SIM") card 146 may also be coupled to the CPU 110 and/or LP processor 111. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 180, for example a battery, is coupled to the on-chip system 102 through a power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103 (See FIG. 3A). However, other types of thermal sensors 157 may be employed without departing from the scope of the invention.

The thermal sensors 157, in addition to being controlled and monitored by an ADC controller 103, may also be controlled and monitored by a TAB module 101. The TAB module 101 may comprise software which is executed by the LP processor 111. However, the TAB module 101 may also be formed from hardware and/or firmware without departing from the scope of the invention. The TAB module 101 may be responsible for monitoring and applying boot sequence delays and/or modifications that may be triggered by any combination of signals generated by the sensors 157. For instance, TAB module 101, in some embodiments, may compare operating temperatures measured by sensors 157A with a temperature threshold and elect to delay the boot sequence based on the comparison. In other embodiments, the TPM module 101 may compare a "touch temperature" measurement taken by a sensor 157B with a temperature threshold and, based on the comparison, elect to modify a boot sequence to bring the PCD 100 online at a reduced level of processing power in an effort to keep the touch temperature from rising. Notably, the application of boot sequence delays and/or modifications by the TAB module 101 may help a PCD 100 optimize user experience by avoiding critical temperatures and repetitive power collapses and reboots.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the on-chip system 102. However, it should be understood that the monitor module 114 may also receive one or more indications or signals from one or more of these external devices by way of the analog signal processor 126 and the CPU 110 and the LP processor 111 to aid in the real time management of the resources operable on the PCD 100. For example, signals polled and generated by the monitor module 114 may be used by the main thermal policy management ("TPM") modules 113 to manage thermal energy generation in the PCD 100 after completion of a boot sequence. Further, it will be understood that one or more of these devices depicted as external to the on-chip system 102 in the exemplary embodiment of a PCD 100 in FIG. 2 may reside on chip 102 in other exemplary embodiments.

In a particular aspect, one or more of the method steps described herein may be implemented by executable instructions and parameters stored in the memory 112 that form the one or more TAB module 101 and TPM module(s) 113. These instructions that form the TAB module 101 and TPM module(s) 113 may be executed by the CPU 110, the analog signal processor 126, the LP processor 111, or another processor, in addition to the ADC controller 103 to perform the methods described herein. Further, the processors 110, 111, 126, the memory 112, the instructions stored therein, or a combination thereof may serve as a means for performing one or more of the method steps described herein.

Figure 3A:
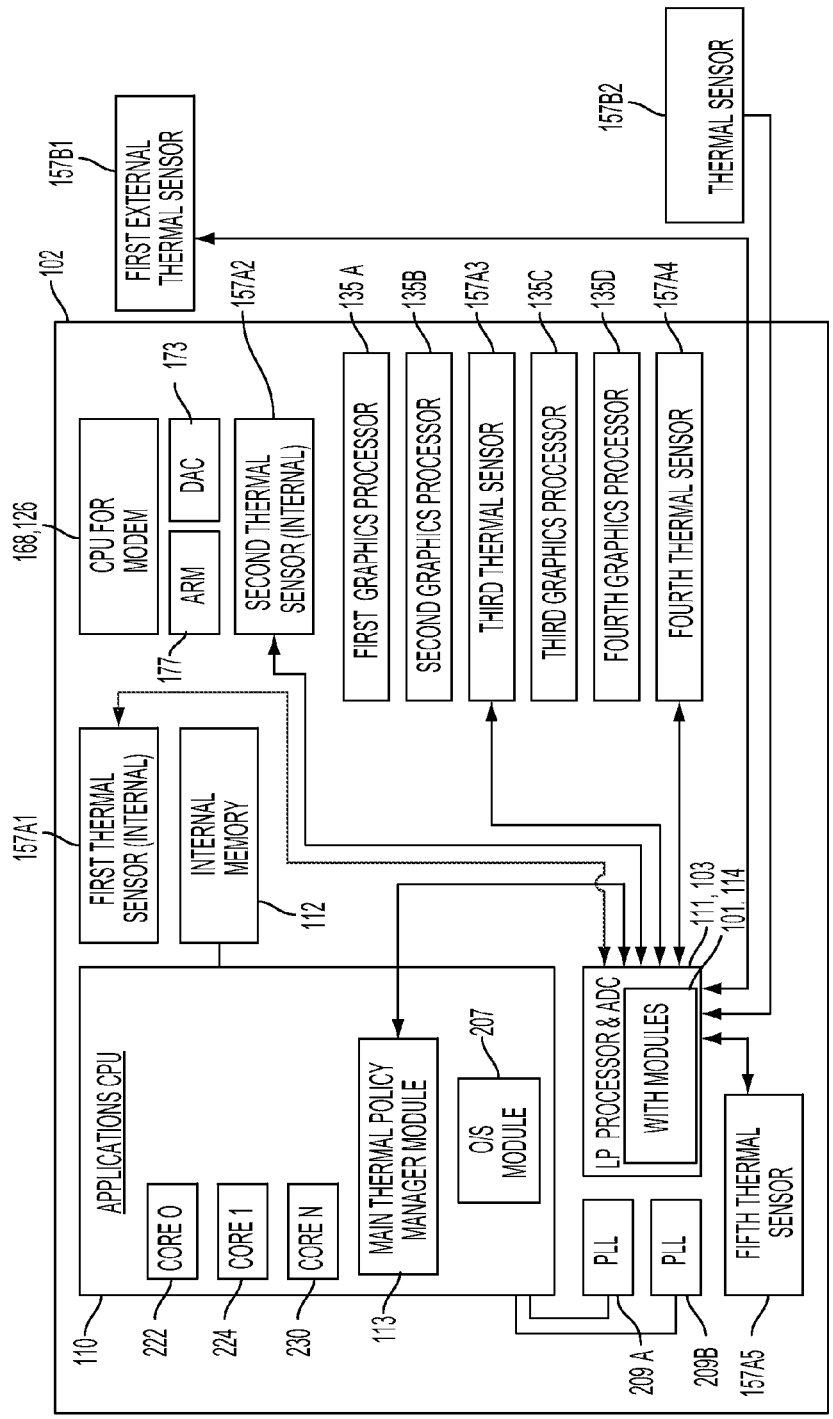
FIG. 3A is a functional block diagram illustrating an exemplary spatial arrangement of hardware for the chip illustrated in FIG. 2.

FIG. 3A is a functional block diagram illustrating an exemplary spatial arrangement of hardware for the chip 102 illustrated in FIG. 2. According to this exemplary embodiment, the applications CPU 110 and LP processor 111 are positioned on the far left side region of the chip 102 while the modem CPU 168, 126 is positioned on a far right side region of the chip 102. The applications CPU 110 may comprise a multi-core processor that includes a zeroth core 222, a first core 224, and an Nth core 230. The applications CPU 110 may be executing a TPM module 113 (when embodied in software) or it may include a TPM module 113 (when embodied in hardware). Similarly, the LP processor 111 may be executing a TAB module 101 (when embodied in software) or it may include a TAB module 101 (when embodied in hardware). The application CPU 110 is further illustrated to include operating system ("O/S") module 207. The LP processor 111 is further illustrated in connection with an ADC controller 103 and to include a monitor module 114. The applications CPU 110 may be coupled to one or more phase locked loops ("PLLs") 209A, 209B, which are positioned adjacent to the applications CPU 110 and in the left side region of the chip 102. The monitor module 114 and ADC controller 103 may be responsible for monitoring and tracking multiple thermal sensors 157 that may be provided "on-chip" 102 and "off-chip" 102.

The on-chip or internal thermal sensors 157A may be positioned at various locations and associated with one or more components proximal to the locations. As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209.

One or more external thermal sensors 157B may also be coupled to the ADC controller 103. The first external thermal sensor 157B1 may be positioned off-chip and adjacent to a top right quadrant of the chip 102 that may include the modem CPU 168, 126, the ARM 177, and DAC 173. A second external thermal sensor 157B2 may be positioned off-chip and adjacent to a lower right quadrant of the chip 102 that may include the third and fourth graphics processors 135C, 135D. Notably, one or more of external thermal sensors 157B may be leveraged to indicate the touch temperature of the PCD 100, i.e. the temperature that may be experienced by a user in contact with the PCD 100.

One of ordinary skill in the art will recognize that various other spatial arrangements of the hardware illustrated in FIG. 3A may be provided without departing from the scope of the invention. FIG. 3A illustrates yet one exemplary spatial arrangement and how the TAB module 101, monitor module 114 and ADC controller 103 may recognize thermal conditions that are a function of the exemplary spatial arrangement illustrated in FIG. 3A, compare the recognized thermal conditions to temperature thresholds and apply logic for authorizing, delaying or modifying a boot sequence.

Figure 3B:
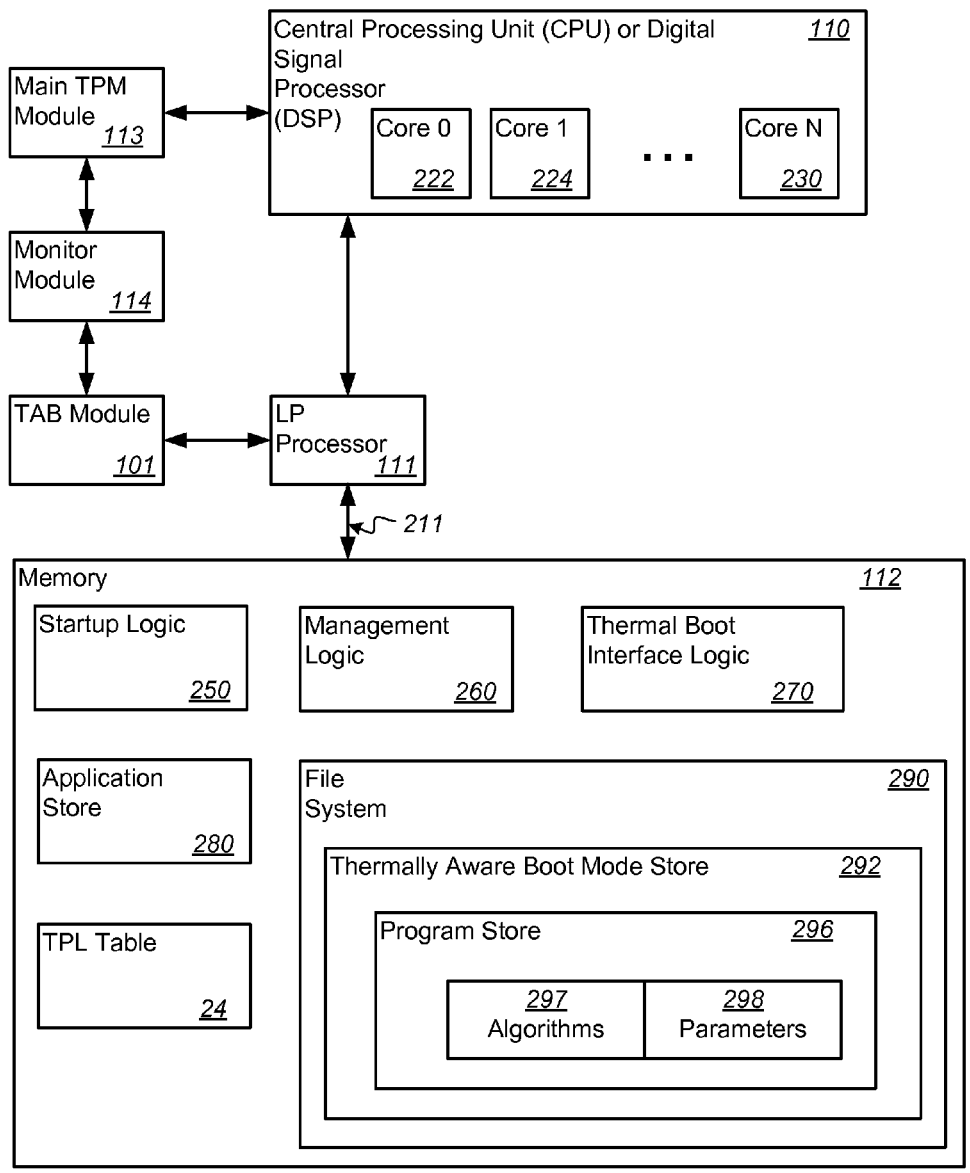
FIG. 3B is a schematic diagram illustrating an exemplary software architecture of the PCD of FIG. 2 for thermally aware booting.

FIG. 3B is a schematic diagram illustrating an exemplary software architecture of the PCD 100 of FIG. 2 and FIG. 3A for supporting thermally aware boot sequences. As illustrated in FIG. 3B, the LP processor 111 is coupled to the memory 112 via a bus 211. The CPU 110, as noted above, is a multiple-core processor having N core processors 222, 224, $N^{th}$ and may include or execute the main thermal policy manager module 113 once the PCD 100 is completely booted and running. As is known to one of ordinary skill in the art, each of the first core 222, the second core 224 and the $N^{th}$ core 230 may be available for supporting a dedicated application or program such as, for example, the program(s) associated with the main TPM module 113. Alternatively, one or more applications or programs may be distributed for processing across two or more of the available cores. Notably, although the execution of methods for thermally aware booting are described in connection with authorizing, delaying or modifying boot sequences relative to CPU 110, one of ordinary skill in the art will recognize that application of such methods may advantageously authorize, delay or modify boot sequences relative to any component within PCD 100 that can be identified as a thermal aggressor.

The LP processor 111 may receive commands from the TAB module 101 that may comprise software and/or hardware. If embodied as software, the TAB module 101 comprises instructions that are executed by the LP processor 111 that issues commands to other application programs being executed by the LP processor 111 and/or other processors. For example, the TAB module 101 may instruct LP processor 111 to cause the boot sequence of a certain component to delay so that thermal energy levels will remain below a threshold that can accommodate the boot of a higher priority component. More specific to the example, a TAB module 101 seeking to ensure that a certain high priority application dedicated to core 222 of CPU 110 is brought online quickly may cause LP processor 111 to delay the boot of the thermally aggressive adjacent core 224. Alternatively, the TAB module 101 may determine that thermally aggressive core 224 may be brought online at a reduced frequency, thereby mitigating the amount of thermal energy it generates and ensuring that the temperature levels near core 222 will not exceed a critical threshold. Advantageously, by doing so, the TAB module 101 may be able to optimize user experience by making the high priority application associated with core 222 available even though the PCD 100 is being booted under less than ideal thermal conditions.

The bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 3B, it should be noted that one or more of startup logic 250, management logic 260, thermal boot interface logic 270, applications in application store 280, data associated with TPL table 24 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory ("RAM") (electronic), a read-only memory ("ROM") (electronic), an erasable programmable read-only memory ("EPROM," "EEPROM," or "Flash" memory) (electronic), an optical fiber (optical), and a portable compact disc read-only memory ("CDROM") (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal boot interface logic 270 are implemented in hardware, the various logic may be implemented with any or a combination of the following technologies, which are each well known in the art: a discrete logic circuit(s) having logic gates for implementing logic functions upon data signals, an application specific integrated circuit ("ASIC") having appropriate combinational logic gates, a programmable gate array(s) ("PGA"), a field programmable gate array ("FPGA"), etc.

The memory 112 may be a non-volatile data storage device such as a flash memory or a solid-state memory device. Although depicted as a single device, the memory 112 may be a distributed memory device with separate data stores coupled to the digital signal processor and/or the LP processor 111.

In one exemplary embodiment for thermally aware booting, the startup logic 250 includes one or more executable instructions for selectively identifying, loading, and executing a select program for managing or controlling a boot sequence. The startup logic 250 may identify, load and execute a select program based on the comparison, by the TAB module 101, of various temperature measurements with threshold temperature settings. An exemplary select program can be found in the program store 296 of the embedded file system 290 and is defined by a specific combination of a boot algorithm 297 and a set of parameters 298. In certain embodiments, the boot algorithm 297 may be directed toward performance scaling of one or more components in PCD 100. The exemplary select program, when executed by the LP processor 111, may operate in accordance with one or more signals provided by the monitor module 114 in combination with control signals provided by the TAB module 101 to delay a boot sequence, authorize completion of a boot sequence, or modify a boot sequence such that one or more components are brought online at a reduced level of power consumption. In this regard, the monitor module 114 may provide one or more indicators of events, processes, applications, resource status conditions, elapsed time, as well as temperature as received from the TAB module 101.

The management logic 260 includes one or more executable instructions for terminating a given thermal boot policy, as well as selectively identifying, loading, and executing a more suitable thermal boot policy. The management logic 260 is arranged to perform these functions at run time or while the PCD 100 is powered and in use by an operator of the device. A replacement program can be found in the program store 296 of the embedded file system 290 and, in some embodiments, may be defined by a specific combination of a boot algorithm 297 and a set of parameters 298.

The replacement program, when executed by the LP processor 111, may operate in accordance with one or more signals provided by the monitor module 114 to authorize, delay or modify a boot sequence for one or more components within PCD 100. In this regard, the monitor module 114 may provide one or more indicators of events, processes, applications, resource status conditions, elapsed time, temperature, current leakage, etc in response to control signals originating from the TAB module 101.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to authorize a boot sequence regardless of temperature measurements when the boot has been delayed for a certain number of times or an aggregate duration.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280, data in the TPL table 24 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280, data in the TPL table 24 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermally aware boot mode store 292. In this regard, the file system 290 may include a reserved section of its total file system capacity for the storage of information for the configuration and management of the various parameters 298 and boot sequence algorithms 297 used by the PCD 100. As shown in FIG. 3B, the store 292 includes a program store 296, which includes one or more thermally aware boot programs.

Figure 4:
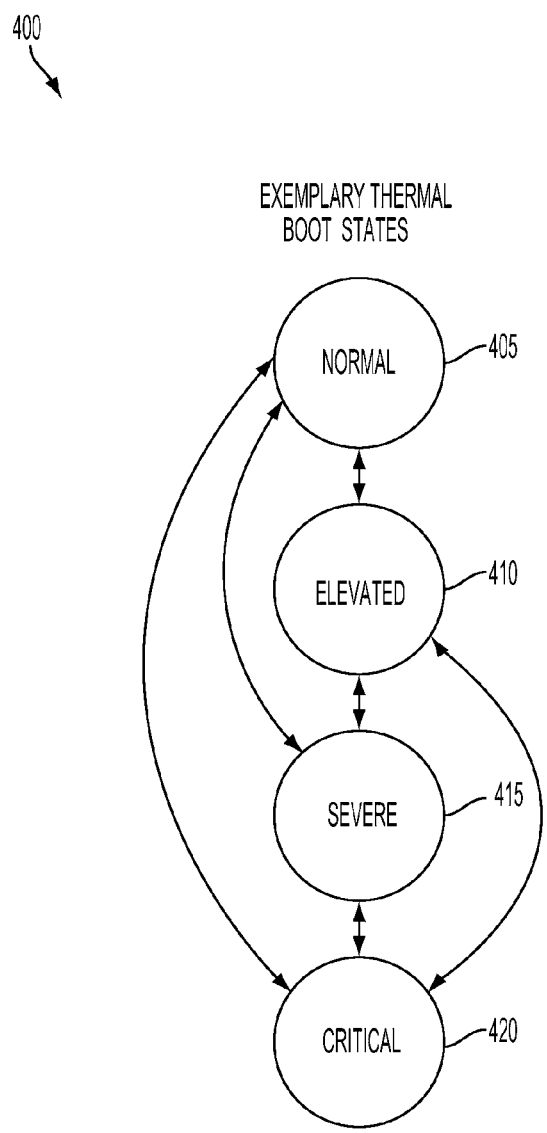
FIG. 4 is an exemplary state diagram that illustrates various thermal boot states that may be recognized and managed to optimize QoS and overall user experience.

FIG. 4 is an exemplary state diagram 400 that illustrates various thermal boot states 405, 410, 415, 420 that may be recognized and managed by a TAB module 101 to optimize QoS and overall user experience of a PCD 100. The first thermal boot state 405 may comprise a "normal" state in which the thermally aware boot policy of the TAB module 101 remains unchanged. In this exemplary first and normal state 405, the temperatures polled by the monitor module 114 are well below predetermined thresholds such that components within the PCD 100 may be booted at full power capacities and functionality without any danger or risk of reaching critical temperatures. In this exemplary state, the touch temperature or other thermal indicator polled by the monitor module 114 may be well under a maximum threshold.

The second thermal boot state 410 may comprise an "elevated" state in which the TAB module 101 may recognize elevated thermal indicators polled by the monitor module and modify its thermally aware boot policy relative to one or more processing components of the PCD 100. This exemplary second state 410 may be reached or entered into by the TAB module 101 when a thermal indicator suggests that all components in the PCD 100 cannot be booted at full power without jeopardizing the health of the PCD 100 or the delivery of mission critical services.

In the second, elevated thermal boot state 410 the TAB module 101 may query the TPL table 24 and request the LP processor 111 to scale the performance of one or more processing components such that the thermal energy generated as a result of booting the components will not cause the PCD 100 to enter a severe or critical state. In this particular state 410, the TAB module 101 is designed to modify a boot sequence by implementing or requesting performance scaling that may be barely perceivable by an operator and which may degrade a quality of service provided by the PCD 100 in a minimal fashion. Further details about this second, elevated thermal boot state 410 will be described below in connection with FIG. 5.

The third thermal boot state 415 may comprise a "severe" state in which the TAB module 101 requests and/or applies more aggressive thermally aware boot policies relative to the second, elevated state 410 described above. This means that in this state the TAB module 1010 is less concerned about quality of service from the perspective of the operator. In this severe thermal boot state, the TAB module 101 is more concerned about mitigating or reducing overall thermal energy dissipation levels in order to decrease temperature of the PCD 100 before completing a boot sequence. In this third thermal boot state 415, one or more components of a PCD 100 may be severely scaled at full boot, or the boot of one or more components killed altogether, such that the implications are readily perceived or observed by an operator. The third, severe thermal boot state 415 and its corresponding thermally aware boot policies applied or triggered by the TAB module 101 will be described in further detail below in connection with FIG. 5.

As the arrows in this diagram illustrate, each thermal boot state may be initiated in sequence or they may be initiated out of sequence depending upon the magnitude of the change in thermal energy dissipation that may be detected. So this means that the TAB module 101 may leave the first and normal thermal boot state 405 and enter into or initiate thermally aware boot policies associated with the third and severe thermal boot state 415 based on a change in a thermal indicator that is detected by sensors 157. Similarly, the PCD 100 may be in the second or elevated thermal boot state 410 and enter into or initiate the fourth or critical state 420 based on a recognized change in a thermal indicator. In this exemplary third and critical state 420, the TAB module 101 may be significantly scaling the power levels of as many processing components as possible in order to boot the PCD 100 without reaching temperatures that cause one or more components contained within the PCD 100 to experience thermal instability or even permanent damage.

This fourth and critical thermal boot state 420 may completely delay the boot sequence of a PCD 100 in order to avoid critical temperatures or permanent damage to one or more components within the PCD 100. The fourth thermal boot state 420 may comprise a "critical" state in which the TAB module 101 applies or triggers a series of delays of the boot sequence in order to provide opportunity for thermal energy to dissipate to safer levels before bringing components online. The fourth and critical thermal state 420 will be described in further detail below in connection with FIG. 5.

The various methods for thermally aware booting are not limited to the four thermal boot states 405, 410, 415, and 420 illustrated in FIG. 4. Depending upon a particular PCD 100, additional or fewer thermal boot states may be provided without departing from the scope of the invention. That is, one of ordinary skill in the art will recognize that additional thermal boot states may improve functionality and operation of a particular PCD 100 while in other situations fewer thermal boot states may be preferred for a particular PCD 100 that has its own unique hardware and/or software.

FIG. 5 is a diagram 500 illustrating exemplary thermally aware boot policies that may be applied to optimize QoS and overall user experience and are dependent upon a particular thermal boot state of a PCD 100, such as the exemplary boot states 405, 410, 415, 420 described relative to the FIG. 4 illustration. As noted previously, in this first thermal boot state 405, thermal indicators as measured by sensors 157 and polled by monitor module 114 may indicate that the PCD 100 is experiencing safe thermal energy levels upon which a full power boot sequence will have no detrimental effect. Usually, in this first thermal boot state, the TAB module 101 is not applying or has not requested any thermally aware boot policy such that the components in the PCD 100 are booted to their fullest potential and highest performance. Accordingly, a boot sequence may be completed without modification or delay and the full functionality of the PCD 100 made available to the user as quickly as possible.

In the second thermal boot state 410, also referred to as the elevated state 410, the TAB module 101 may initiate or request thermally aware boot policies with the objective to maintain high-performance with little or no perception in degradations to the quality of service as perceived by the operator of the PCD 100. The PCD 100 is booted to near full power levels with only slight scaling of processing components dedicated to lower priority workloads. Alternatively, various processing components associated with elevated thermal indicators may be booted to some power level less than full, without regard for the priority of workloads assigned to the components.

Referring now to the third thermal boot state 415 of FIG. 5, also known as the severe state 415, the TAB module 101 may apply or request more aggressive thermally aware boot policies with probable perceivable reduced performance observed by an operator of the PCD 100. According to this exemplary thermal boot state 415, the TAB module 101 may cause reduction in power to one or more components like GPU 182 and or cores of CPU 110 when booted. The TAB module 101 may also completely delay booting of some components in favor of bringing other processing components online that are associated with higher priority workloads. Essentially, the thermally aware boot policies of this third and severe thermal boot state 415 may be the same as those described above with respect to the second, elevated thermal boot state 410. However, these same thermally aware boot policies may be applied in a more aggressive manner.

Referring now to the fourth and critical thermal boot state 420 of FIG. 5, the TAB module 101 may recognize that the PCD 100 is experiencing critical levels of thermal energy dissipation and, as such, cannot sustain a boot sequence of any nonessential hardware. The TAB module 101 may instruct the LP processor 111 to delay the boot sequence entirely until excess thermal energy has had a chance to dissipate or, perhaps, authorize only the boot of essential hardware. "Nonessential" hardware and/or software modules may be different for each type of particular PCD 100. According to one exemplary embodiment, all nonessential hardware and/or software modules may include all of those outside of an emergency 911 telephone call function and global positioning system ("GPS") functions. This means that the TAB module 101 in this fourth, critical thermal boot state 420 may cause the booting of all components that do not affect emergency 911 telephone calls and GPS functionality to be delayed. The TAB module 101 may authorize or deny the booting of components in sequence and/or in parallel depending upon the critical temperatures or thermal indicators being monitored by the monitor module 114.

Figure 6:
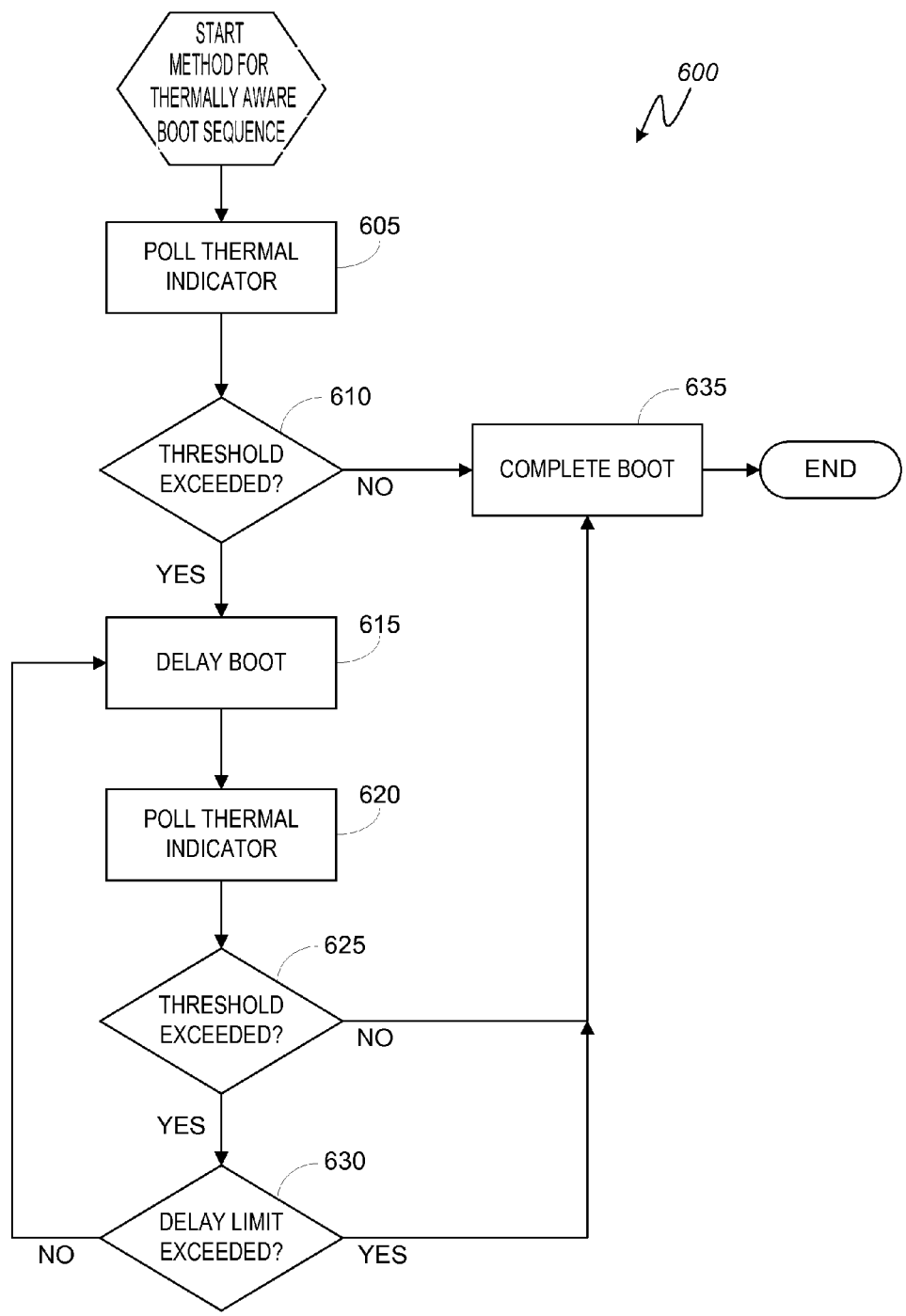
FIG. 6 is a logical flowchart illustrating a method for thermally aware booting in a PCD that includes authorizing or delaying a boot sequence based on monitored thermal conditions.

FIG. 6 is a logical flowchart illustrating a method 600 for thermally aware booting in a PCD 100 that includes authorizing or delaying a boot sequence based on monitored thermal indicators. Method 600 of FIG. 6 starts with a first block 605 in which the TAB module 101 in conjunction with the monitor module 114 poll one or more thermal indicator sensors 157, such as temperature sensors, located either on or off the integrated circuit 102. Notably, as explained above, the various sensors 157 are associated with components within PCD 100 and are polled or monitored during the early stages of a boot sequence. As such, at the time that the function represented by block 605 is initially executed, many of the components within PCD 100 are not online.

At decision block 610, the TAB module 101 compares the measurements polled at block 605 to predetermined thresholds (for this illustration, the thermal indicator and associated thresholds will be described in the context of a temperature reading). The predetermined temperature thresholds may indicate maximum acceptable temperatures at which various components within the PCD 100 may be booted without risking or jeopardizing the health of the components from potentially excessive thermal energy generation and dissipation during the boot process. If the measured temperatures are determined at decision block 610 to be under the relevant thresholds for components associated with the polled sensors 157, then the "no" branch is followed to block 635 and the PCD 100 is allowed to complete the boot sequence. Notably, completion of the boot process may include full power supplied to processing components such as CPU 110. Advantageously, by polling the sensors 157 and verifying that the measured temperatures are beneath predetermined thresholds of components associated with sensor(s) 157, the PCD 100 may be completely booted and brought to full levels of quality of service ("QoS") without risking the health of the components within the PCD 100 or overly sacrificing user experience.

If, at decision block 610 one or more of the measured temperatures are determined to exceed the predetermined thresholds, then the TAB module 101 may deduce that completion of the boot sequence will cause thermal energy generation and dissipation to jeopardize the health of the components. In such a situation under the exemplary method 600, the "yes" branch is followed to block 615 and the boot sequence is delayed. Advantageously, by delaying the boot sequence, thermal energy may be given an opportunity to dissipate, thereby lowering the temperatures to levels beneath the threshold. The length of the delay may be predetermined or, in some embodiments, the length of delay may be calculated relative to the difference between the measured values and the predetermined thresholds.

After delaying the boot sequence at block 615, the temperature sensors 157 are again polled at block 620 and again compared to the predetermined thresholds. If the measured temperatures indicate that the delay has allowed the excess thermal energy to dissipate such that the temperatures are now below the thresholds, then the "no" branch is followed to block 635 and the PCD 100 is allowed to complete the boot sequence. If, however, at decision block 625 one or more of the temperatures still exceeds the predetermined threshold(s), then the "yes" branch is followed to decision block 630.

At decision block 630, the number of times or aggregate length of delay is verified and, if a predetermined threshold for delay cycles has been met, then the "yes" branch may be followed to block 635 where the PCD 100 is allowed to complete the boot sequence even though the measured temperatures are still above the maximum thresholds. Notably, in the interest of optimizing QoS and user experience, it is envisioned that some embodiments of a system and method for thermally aware booting may include a maximum number of delay cycles. The maximum number of cycles, or aggregate duration of delay cycles, may be calculated based on a trade-off of risk in booting the PCD 100 under elevated temperature conditions with user experience and QoS levels.

If at decision block 630 it is determined that a maximum number of delay cycles, or aggregate duration of delay cycles, has not been met, then the "no" branch may be followed back to block 615 where the boot sequence is further delayed to allow for additional thermal energy dissipation. In this manner, the series of blocks 615 through 630 are repeated until the algorithm dictates that the method move to block 635 and the PCD 100 be allowed to complete the boot sequence.

Figure 7:
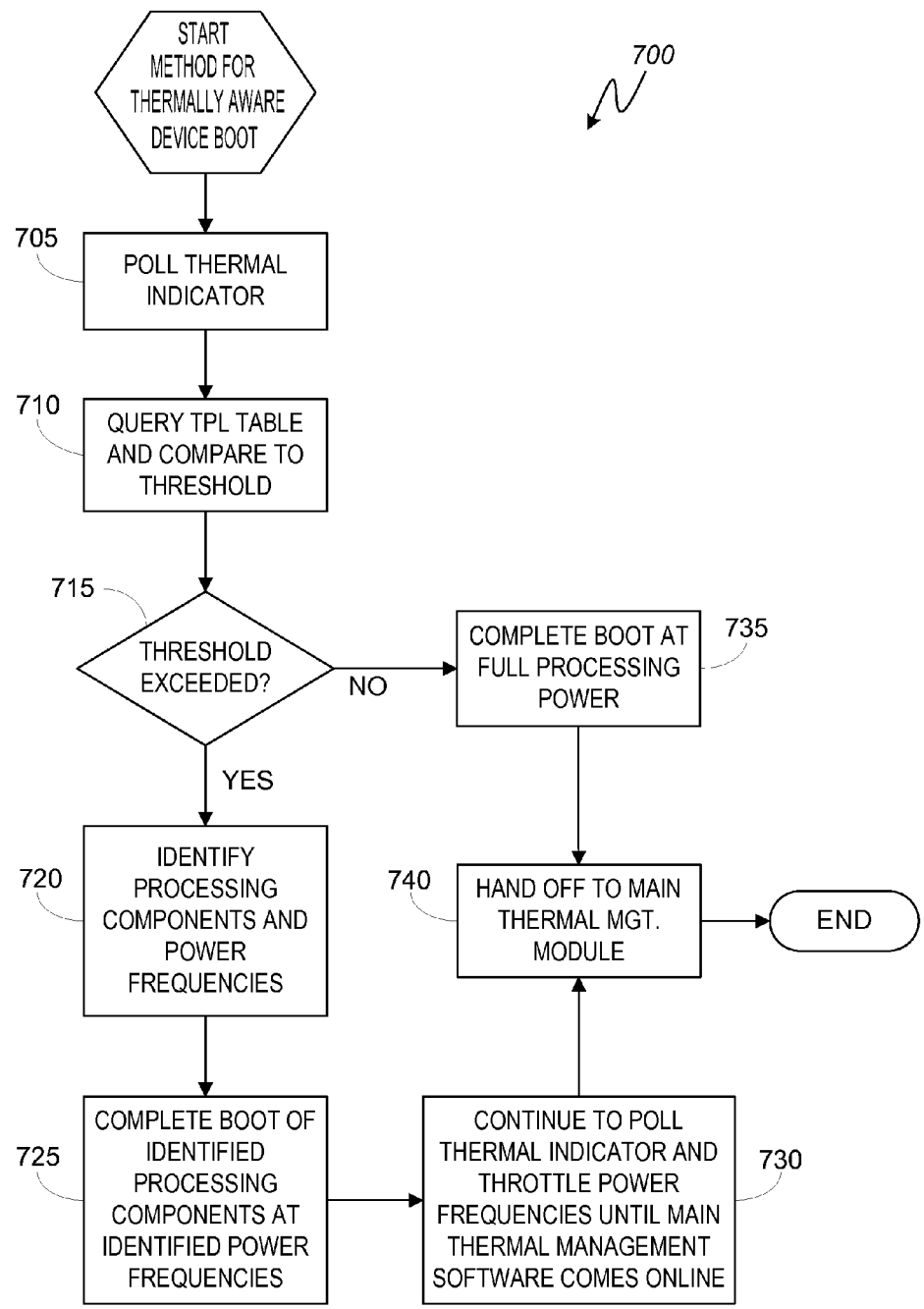
FIG. 7 is a logical flowchart illustrating a method for thermally aware booting in a PCD that includes modifying a boot sequence based on recognition of thermal boot states and according to the thermal performance lookup table of FIG. 8.

FIG. 7 is a logical flowchart illustrating a method 700 for thermally aware booting in a PCD 100 that includes modifying a boot sequence based on recognition of thermal boot states (see FIGS. 4-5 for exemplary states) and according to the exemplary thermal performance lookup table of FIG. 8. FIG. 8 is an exemplary thermal performance lookup table 24 that may be queried by embodiments of a method for thermally aware booting, such as the exemplary method 700 illustrated in FIG. 7. The FIG. 8 thermal performance lookup table 24 will be described in parallel with the exemplary thermally aware booting method 700.

Beginning at block 705, the monitor module 114 may poll one or more sensors 157 for measurements associated with a thermal indicator. As described above, it is envisioned that the measurements polled by the monitor module 114 may be associated with any thermal indicator including, but not limited to, operating temperature, touch temperature, leakage current on power rail(s), battery state of charge, etc. The thermal indicator measurements may be converted to digital signals and forwarded to the TAB module 101. At block 710, the TAB module 101 may query the thermal performance lookup table 24 (see FIG. 8) and compare the measurements to the various thermal indicator ranges contained in the table 24. Subsequently, at decision block 715 the TAB module 101 may determine which, if any, of the thresholds contained in the table 24 have been exceeded.

Referring to the FIG. 8 illustration, the thermal indicator is in the form of temperature measurements and the lowest threshold is 65° C. Therefore, if at decision block 715 the TAB module 101 determines from its query of table 24 that the temperature measurement taken at block 705 is below the 65° C. threshold then the thermal boot policy associated with the "normal" thermal boot state may be applied at block 735. In the exemplary TPL table 24 of FIG. 8, the "normal" thermal boot state dictates that the TAB module 101 authorize the boot sequence without modification, i.e. that the two exemplary cores come online at a full processing speed of 1.5 GHz each. Once the two cores come online at full processing speeds of 1.5 GHz, at block 740 the main TPM module 113 may come online to apply thermal management policies and implement thermal management techniques.

If, however, at decision block 715 the TAB module 101 determines from the block 710 comparison that the temperature measurement exceeds a threshold queried from TPL table 24, then the "yes" branch is followed to block 720. At block 720, the TAB module 101 may select the appropriate thermal boot policy from TPL table 24 based on the highest threshold exceeded. For example, referring to the FIG. 8 illustration, if the temperature measurement taken at block 705 exceeds 65° C. but is less than 76° C. then the policy associated with the "elevated" thermal boot state may be applied at block 725 by the TAB module 101. That is, the TAB module 101 may modify the boot sequence by instructing the LP processor 111 to boot each of the two exemplary cores to a reduced frequency of 918 MHz. Advantageously, by modifying the boot sequence in this way, the amount of thermal energy generated by the cores when fully booted may not be enough to exasperate the present thermal conditions and jeopardize the health of one or more components within the PCD 100, yet still provide a high level of QoS and user experience to the user of PCD 100.

Referring back to blocks 720 and 725, if at decision block 715 the temperature measurement is determined to exceed 76° C. but not 80° C., the TAB module 101 may apply the thermal boot policy associated with the "severe" thermal boot state and instruct the LP processor 111 to only complete the boot process for a single core and at a reduced frequency of 786 MHz. While the exemplary thermal boot policy of the severe thermal boot state is more aggressive than that described relative to the elevated boot state, one of ordinary skill in the art will recognize that the policy may at least provide some functionality to a user of a PCD 100 even when the PCD 100 is asked to boot under severe thermal conditions that could damage components.

Similarly, if the TAB module 101 determines from its query of TPL table 24 that the measured temperature exceeds 80° C. then a critical thermal boot state may be recognize and the LP processor 111 instructed by the TAB module 101 to delay the entire boot sequence until excess thermal energy has had an opportunity to dissipate. Notably, as was described relative to the FIG. 6 method 600, the monitor module 101 may continue to poll the thermal indicator (block 705) and the method 700 repeated until the PCD 100 is booted according to a thermal boot policy.

Once booted at block 725 according to a thermal boot policy, at block 730 certain embodiments of a TAB module 101 may continue to poll the thermal indicator and adjust power frequencies of the processing components up or down based on the thermal indicator. Advantageously, by continuing to apply thermal management techniques to processing cores that have been booted to a frequency level less than full power, a TAB module 101 may optimize QoS and user experience until thermal conditions are suitable for the processing components to bring the main TPM module 113 online at block 740.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for thermally aware booting in a personal portable computing device ("PCD"), the method comprising:
   initiating a boot sequence for a component within the PCD;
   polling a sensor in the PCD during the boot sequence for the component within the PCD for a measurement of a thermal indicator, wherein the sensor is associated with the component;
   comparing the polled measurement to a predetermined threshold;
   determining whether the polled measurement exceeds the predetermined threshold; and
   if the polled measurement exceeds the predetermined threshold, delaying the boot sequence for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

2. The method of claim 1, wherein the thermal indicator is an on-die temperature.

3. The method of claim 1, wherein the thermal indicator is a touch temperature of the PCD.

4. The method of claim 1, wherein the thermal indicator is a state of charge of a battery in the PCD.

5. The method of claim 1, wherein the thermal indicator is an electrical current level on a power rail in the PCD.

6. The method of claim 1, wherein the predetermined threshold is based on a maximum operating temperature of the one or more components associated with the sensor.

7. The method of claim 1, further comprising polling the sensor a second time and, if the polled measurement still exceeds the predetermined threshold, delaying the boot sequence a second time.

8. The method of claim 1, further comprising polling the sensor a second time and, if the polled measurement is less than the predetermined threshold, authorizing completion of the boot sequence.

9. The method of claim 1, further comprising polling the sensor a plurality of times wherein:
   if any polled measurement is less than the predetermined threshold, authorizing completion of the boot sequence; and
   if the sensor is polled more than a predetermined number of times, authorizing completion of the boot sequence.

10. The method of claim 1, wherein the PCD comprises a mobile phone.

11. A computer system for thermally aware booting in a personal portable computing device ("PCD"), the system comprising:
    a low power ("LP") processor, configured to:
    initiate a boot sequence for a component within the PCD; and
    a monitor module, configured to:
    poll a sensor in the PCD during the boot sequence for the component within the PCD for a measurement of a thermal indicator, wherein the sensor is associated with the component; and
    a thermally aware boot ("TAB") module, configured to:
    compare the polled measurement to a predetermined threshold;
    determine whether the polled measurement exceeds the predetermined threshold;
    and if the polled measurement exceeds the predetermined threshold, instruct the LP processor to delay the boot sequence for the component within the PCD and reduce the boot performance level to one of a plurality of preset performance levels that will not cause the PCD to exceed a predetermined thermal threshold, the preset performance level corresponding to the severity of the measured temperature of the PCD component exceeding the threshold.

12. The computer system of claim 11, wherein the thermal indicator is an on-die temperature.

13. The computer system of claim 11, wherein the thermal indicator is a touch temperature of the PCD.

14. The computer system of claim 11, wherein the thermal indicator is a state of charge of a battery in the PCD.

15. The computer system of claim 11, wherein the thermal indicator is an electrical current level on a power rail in the PCD.

16. The computer system of claim 11, wherein the predetermined threshold is based on a maximum operating temperature of the one or more components associated with the sensor.

17. The computer system of claim 11, wherein the monitor module is further configured to poll the sensor a second time and the TAB module is further configured to cause delay of the boot sequence a second time if the polled measurement still exceeds the predetermined threshold.

18. The computer system of claim 11, wherein the monitor module is further configured to poll the sensor a second time and the TAB module is further configured to authorize completion of the boot sequence if the polled measurement is less than the predetermined threshold.

19. The computer system of claim 11, wherein the monitor module is further configured to poll the sensor a plurality of times and the TAB module is further configured to:
   authorize completion of the boot sequence if any polled measurement is less than the predetermined threshold; and
   authorize completion of the boot sequence if the sensor is polled more than a predetermined number of times.

20. The computer system of claim 11, wherein the PCD comprises a mobile phone.

21. A computer system for thermally aware booting in a personal portable computing device ("PCD"), the system comprising:
   means for initiating a boot sequence for a component within the PCD;
   means for polling a sensor in the PCD during the boot sequence for the component within the PCD for a measurement of a thermal indicator, wherein the sensor is associated with the component;
   means for comparing the polled measurement to a predetermined threshold;
   means for determining whether the polled measurement exceeds the predetermined threshold; and
   means for delaying the boot sequence if the polled measurement exceeds the predetermined threshold for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

22. The computer system of claim 21, wherein the thermal indicator is an on-die temperature.

23. The computer system of claim 21, wherein the thermal indicator is a touch temperature of the PCD.

24. The computer system of claim 21, wherein the thermal indicator is a state of charge of a battery in the PCD.

25. The computer system of claim 21, wherein the thermal indicator is an electrical current level on a power rail in the PCD.

26. The computer system of claim 21, wherein the predetermined threshold is based on a maximum operating temperature of the one or more components associated with the sensor.

27. The computer system of claim 21, further comprising means for polling the sensor a second time and, if the polled measurement still exceeds the predetermined threshold, means for delaying the boot sequence a second time.

28. The computer system of claim 21, further comprising means for polling the sensor a second time and, if the polled measurement is less than the predetermined threshold, means for authorizing completion of the boot sequence.

29. The computer system of claim 21, further comprising means for polling the sensor a plurality of times and:
   means for authorizing completion of the boot sequence if any polled measurement is less than the predetermined threshold; and
   means for authorizing completion of the boot sequence if the sensor is polled more than a predetermined number of times.

30. The computer system of claim 21, wherein the PCD comprises a mobile phone.

31. A computer program product comprising a non-transitory computer-readable device having a computer readable program code embodied therein, said computer readable program code adapted to be executed to implement a method for thermally aware booting in a personal portable computing device ("PCD"), said method comprising:
   initiating a boot sequence for a component within the PCD;
   polling a sensor in the PCD during the boot sequence for the component within the PCD for a measurement of a thermal indicator, wherein the sensor is associated with the component;
   comparing the polled measurement to a predetermined threshold;
   determining whether the polled measurement exceeds the predetermined threshold; and
   if the polled measurement exceeds the predetermined threshold, delaying the boot sequence for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

32. The computer program product of claim 31, wherein the thermal indicator is an on-die temperature.

33. The computer program product of claim 31, wherein the thermal indicator is a touch temperature of the PCD.

34. The computer program product of claim 31, wherein the thermal indicator is a state of charge of a battery in the PCD.

35. The computer program product of claim 31, wherein the thermal indicator is an electrical current level on a power rail in the PCD.

36. The computer program product of claim 31, wherein the predetermined threshold is based on a maximum operating temperature of the one or more components associated with the sensor.

37. The computer program product of claim 31, further comprising polling the sensor a second time and, if the polled measurement still exceeds the predetermined threshold, delaying the boot sequence a second time.

38. The computer program product of claim 31, further comprising polling the sensor a second time and, if the polled measurement is less than the predetermined threshold, authorizing completion of the boot sequence.

39. The computer program product of claim 31, further comprising polling the sensor a plurality of times wherein:
   if any polled measurement is less than the predetermined threshold, authorizing completion of the boot sequence; and
   if the sensor is polled more than a predetermined number of times, authorizing completion of the boot sequence.

40. The computer program product of claim 31, wherein the PCD comprises a mobile phone.

41. A method for thermally aware booting in a personal portable computing device ("PCD"), the method comprising:
   initiating a boot sequence for a component within the PCD;

polling a sensor in the PCD during the boot sequence for the component within the PCD for a measurement of a thermal indicator, wherein the sensor is associated with the component;

querying a thermal policy lookup ("TPL") table, wherein the TPL table comprises thermal boot policies associated with thresholds for the thermal indicator;

comparing the polled measurement to the thresholds;

identifying a thermal boot policy; and applying the identified thermal boot policy, wherein applying the thermal boot policy comprises modifying the boot sequence for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

42. The method of claim 41, wherein the thermal indicator is an on-die temperature.

43. The method of claim 41, wherein the thermal indicator is a touch temperature of the PCD.

44. The method of claim 41, wherein the thermal indicator is a state of charge of a battery in the PCD.

45. The method of claim 41, wherein the thermal indicator is an electrical current level on a power rail in the PCD.

46. The method of claim 41, wherein the predetermined threshold is based on a maximum operating temperature of the one or more components associated with the sensor.

47. The method of claim 41, wherein modifying the boot sequence comprises delaying the boot sequence for one or more components in the PCD and scaling the performance level to which one or more components in the PCD is booted.

48. The method of claim 41, wherein modifying the boot sequence comprises delaying the boot sequence for the PCD.

49. The method of claim 41, wherein the PCD comprises a mobile phone.

50. A computer system for thermally aware booting in a personal portable computing device ("PCD"), the system comprising:

a low power ("LP") processor, configured to:
initiate a boot sequence for a component within the PCD;
a monitor module, configured to:
poll a sensor in the PCD during the boot sequence for the component within the PCD for a measurement of a thermal indicator, wherein the sensor is associated with the component; and
a thermally aware boot ("TAB") module, configured to:
query a thermal policy lookup ("TPL") table, wherein the TPL table comprises thermal boot policies associated with thresholds for the thermal indicator;
compare the polled measurement to the thresholds;
identify a thermal boot policy; and
apply the identified thermal boot policy, wherein applying the thermal boot policy comprises instructing the LP processor to modify the boot sequence for the component within the PCD and reduce the boot performance level to one of a plurality of preset performance levels that will not cause the PCD to exceed a predetermined thermal threshold, the preset performance level corresponding to the severity of the measured temperature of the PCD component exceeding the threshold.

51. The computer system of claim 50, wherein the thermal indicator is an on-die temperature.

52. The computer system of claim 50, wherein the thermal indicator is a touch temperature of the PCD.

53. The computer system of claim 50, wherein the thermal indicator is a state of charge of a battery in the PCD.

54. The computer system of claim 50, wherein the thermal indicator is an electrical current level on a power rail in the PCD.

55. The computer system of claim 50, wherein the predetermined threshold is based on a maximum operating temperature of the one or more components associated with the sensor.

56. The computer system of claim 50, wherein modifying the boot sequence comprises delaying the boot sequence for one or more components in the PCD and scaling the performance level to which one or more components in the PCD is booted.

57. The computer system of claim 50, wherein modifying the boot sequence comprises delaying the boot sequence for the PCD.

58. The computer system of claim 50, wherein the PCD comprises a mobile phone.

59. A computer system for thermally aware booting in a personal portable computing device ("PCD"), the system comprising:

means for initiating a boot sequence for a component within the PCD;
means for polling a sensor in the PCD during the boot sequence for the component within the PCD for a measurement of a thermal indicator, wherein the sensor is associated with the component;
means for querying a thermal policy lookup ("TPL") table, wherein the TPL table comprises thermal boot policies associated with thresholds for the thermal indicator;
means for comparing the polled measurement to the thresholds;
means for identifying a thermal boot policy; and
means applying the identified thermal boot policy, wherein applying the thermal boot policy comprises modifying the boot sequence for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

60. The computer system of claim 59, wherein the thermal indicator is an on-die temperature.

61. The computer system of claim 59, wherein the thermal indicator is a touch temperature of the PCD.

62. The computer system of claim 59, wherein the thermal indicator is a state of charge of a battery in the PCD.

63. The computer system of claim 59, wherein the thermal indicator is an electrical current level on a power rail in the PCD.

64. The computer system of claim 59, wherein the predetermined threshold is based on a maximum operating temperature of the one or more components associated with the sensor.

65. The method of claim 59, wherein modifying the boot sequence comprises delaying the boot sequence for one or more components in the PCD and scaling the performance level to which one or more components in the PCD is booted.

66. The method of claim 59, wherein modifying the boot sequence comprises delaying the boot sequence for the PCD.

67. The computer system of claim 59, wherein the PCD comprises a mobile phone.

68. A computer program product comprising a non-transitory computer-readable device having a computer readable program code embodied therein, said computer readable program code adapted to be executed to implement a method for thermally aware booting in a personal portable computing device ("PCD"), said method comprising:
  initiating a boot sequence for a component within the PCD;
  polling a sensor in the PCD during the boot sequence for the component within the PCD for a measurement of a thermal indicator, wherein the sensor is associated with the component;
  querying a thermal policy lookup ("TPL") table, wherein the TPL table comprises thermal boot policies associated with thresholds for the thermal indicator;
  comparing the polled measurement to the thresholds;
  identifying a thermal boot policy; and
  applying the identified thermal boot policy, wherein applying the thermal boot policy comprises modifying the boot sequence for the component within the PCD and reducing the boot performance level to one of a plurality of preset performance levels that will not cause the PCD to exceed a predetermined thermal threshold, the preset performance level corresponding to the severity of the measured temperature of the PCD component exceeding the threshold.

69. The computer program product of claim 68, wherein the thermal indicator is an on-die temperature.

70. The computer program product of claim 68, wherein the thermal indicator is a touch temperature of the PCD.

71. The computer program product of claim 68, wherein the thermal indicator is a state of charge of a battery in the PCD.

72. The computer program product of claim 68, wherein the thermal indicator is an electrical current level on a power rail in the PCD.

73. The computer program product of claim 68, wherein the predetermined threshold is based on a maximum operating temperature of the one or more components associated with the sensor.

74. The computer program product of claim 68, wherein modifying the boot sequence comprises delaying the boot sequence for one or more components in the PCD and scaling the performance level to which one or more components in the PCD is booted.

75. The computer program product of claim 68, wherein modifying the boot sequence comprises delaying the boot sequence for the PCD.

76. The computer program product of claim 68, wherein the PCD comprises a mobile phone.

* * * * *